(12) United States Patent
Taft et al.

(10) Patent No.: US 8,886,476 B1
(45) Date of Patent: Nov. 11, 2014

(54) MULTI-TERMINAL PROTECTION USING PHASOR MEASUREMENT UNIT NETWORKS

(75) Inventors: Jeffrey D. Taft, Washington, PA (US); Navindra Yadav, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 13/239,655

(22) Filed: Sep. 22, 2011

(51) Int. Cl.
*G01R 31/00* (2006.01)
*G05D 3/12* (2006.01)

(52) U.S. Cl.
USPC ............................................. 702/59; 700/286

(58) Field of Classification Search
CPC ...... G01D 4/004; G01R 22/063; G01R 29/16; G01R 29/18; H04L 67/06; H04L 12/2602; H04L 43/00; H04L 49/00
USPC ................. 702/59, 57–58, 60–62, 64–65, 72, 702/81–82, 127, 182–185, 188–189; 340/3.1–3.2, 3.21, 3.43, 3.5, 340/3.51–3.54; 700/286, 291–292, 700/297–298
See application file for complete search history.

(56) References Cited

PUBLICATIONS

Galli et al., For the Grid and Through the Grid: The Role of Power Line Communications in the Smart Grid, Jan. 12, 2011, 26 pp.*
Wang et al., A Survey on the Communication Architectures in Smart Grid, Jul. 27, 2011, Computer Networks 55, pp. 3604-3629.*
"The Complexity of Protecting Three-Terminal Transmission Lines", Prepared by the System Protection and Control Task Force of the NERC Planning Committee, Sep. 13, 2006, 35 pages.
Jianqing Zhang, "Secure Multicast for Power Grid Communications", Dissertation submitted in partial fulfillment of the requirements for the degree of Doctor of Philosophy in Computer Science in the Graduate College of the University of Illinois at Urbana-Champaign, 2010, 109 pages.

* cited by examiner

*Primary Examiner* — Toan Le
(74) *Attorney, Agent, or Firm* — Edell, Shapiro & Finnan, LLC

(57) ABSTRACT

At a network device of each of a plurality of generator substations that is connected to a multi-terminal transmission line, phasor measurement data produced by a phasor measurement unit at the generator substation is assigned to a multicast stream. A request is received from a network device at any of the plurality of the generator substations to join the multicast stream so that a destination device at any of the plurality of generator substations receives the phasor measurement data carried by the multicast stream. The multicast stream is sent for distribution to one or more destination devices at respective ones of the plurality of generator substations.

23 Claims, 6 Drawing Sheets

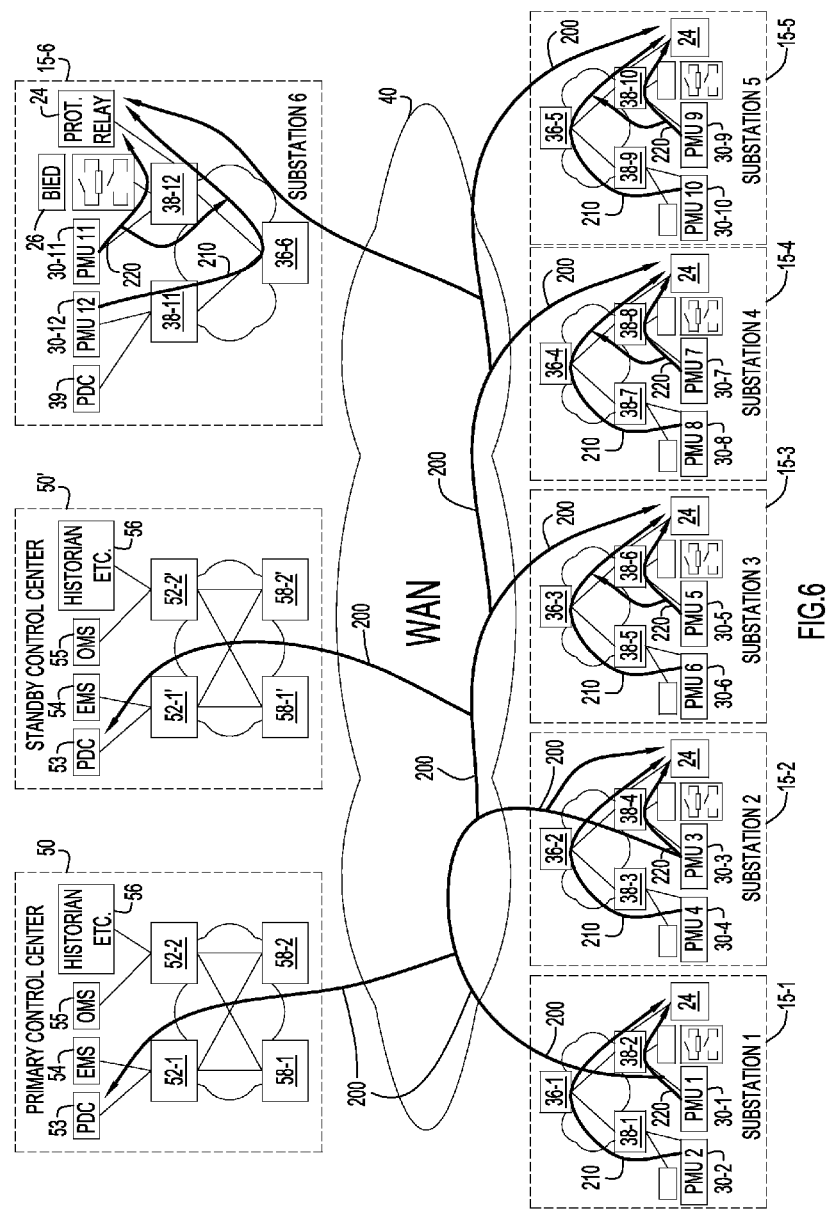

MULTI-TERMINAL PROTECTION USING PHASOR MEASUREMENT UNIT NETWORKS

TECHNICAL FIELD

The present disclosure relates to terminal protection techniques in electrical power transmission systems.

BACKGROUND

Electric utilities connect alternating current (AC) generators to AC transmission lines in one of three configurations: (1) single-terminal in which one generator is attached to one end of a transmission line; (2) two-terminal in which two generators are attached to the two ends of a single transmission line; and (3) three-terminal in which three generators are connected to the ends of a T-configured transmission line, where a line tap is used to establish the T connection.

The concept of a multi-terminal (meaning more than three terminal) transmission line is generally considered only in the case of high voltage direct current (HVDC) transmission systems, whereas it is highly desirable for reasons of economics to build AC multi-terminal transmission lines by adding taps to existing AC transmission lines Each AC generator requires protection and relays located at each AC generator are programmed to provide the ability to disconnect the generator from the transmission via circuit breakers, as needed. In the two-terminal and three-terminal AC cases, protection is complicated, since each relay can only make line measurements locally, whereas the protection schemes need to take into account such issues as where on the transmission line the fault is located. Location of the fault is estimated by each relay using fault-time line impedance and a model for transmission line per unit impedance to calculate electrical distance to the fault. Each relay has a defined protection zone, so determination of the fault location is crucial to determining which zone applies. For each zone, different time/fault current parameters apply. In the case of two-terminal systems, relays at each end can accurately measure current being fed into the fault from its own end and therefore fault distance calculations work well.

In the case of three or more terminals on AC transmission lines, this is not the case. Regardless of the fault location, there exists a situation where two of the generators are providing current into the fault from the same side. Each generator relay can only measure its own contribution to the total fault current on that side. Therefore, the calculation of fault location will not be accurate and proper coordination of protection schemes at the terminals is hindered. The problem can be solved for three-terminal systems with a variety of ad hoc rules programmed into the relays. As the number of terminals increases beyond three, the problem becomes more complex, such that practical systems are limited to three terminals. The basic issue, as in many grid protection and control issues, is lack of observability. In the case of the multi-terminal protection problem, this is a limiting factor in attaching new power sources, such as wind farms, to existing transmission lines.

BRIEF DESCRIPTION OF THE DRAWINGS

FIG. 6 is a block diagram showing different data stream flows according to various examples of the techniques described herein.

DESCRIPTION OF EXAMPLE EMBODIMENTS

Overview

At a network device of each of a plurality of generator substations that is connected to a multi-terminal transmission line, phasor measurement data produced by a phasor measurement unit (PMU) at the generator substation is assigned to a multicast stream. A request is received from a network device at all of the other generator substations to join the multicast stream so that destination devices at all of the plurality of generator substations receive the phasor measurement data carried by the multicast stream. The multicast stream is sent for distribution to one or more destination devices at respective ones of the plurality of generator substations.

Example Embodiments

Techniques and network architectures are provided herein for a phasor measurement unit network suitable for multi-terminal transmission lines. Low latency networking is used to improve multi-terminal transmission line observability by transporting synchrophasor data from each generator substation to all of the other generator substations simultaneously to support advanced multi-terminal protection schemes. A phasor is phase angle vector that contains both phase and magnitude information.

Figure 1:
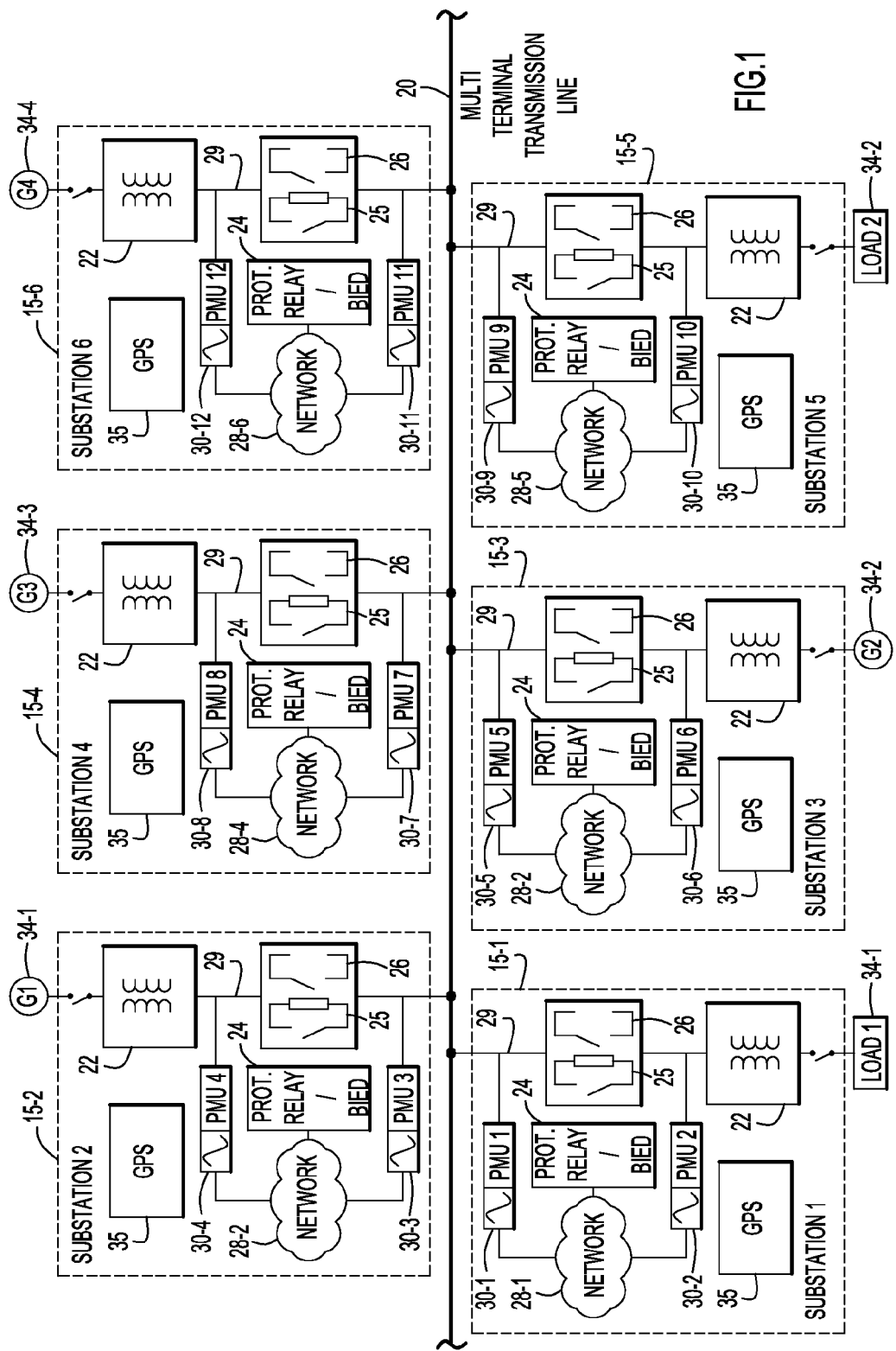
FIG. 1 is a system block diagram showing a plurality of substations connected to a multi-terminal transmission system and configured to share measurement data according to the techniques described herein.

Referring first to FIG. 1, a multi-terminal transmission system phasor measurement unit (PMU) network architecture is shown generally at reference numeral 10. FIG. 1 is an electrical view that shows the potential placement of the PMUs in the electrical domain. There is a plurality of generator substations 15-1 through 15-6, e.g., Substations 1-6, respectively. Each substation 15-1 through 15-16 is connected to a multi-terminal transmission line 20. Common to each of the substations 15-1 through 15-6 is a transformer bus bar unit 22, a protection relay/breaker intelligent electronic device (BIED) 24, a circuit breaker 25, switch 26, a substation communication network and one or more PMUs. In each generator substation, the circuit breaker 25 and switch 26 are connected between the transformer bus bar unit 22 and the multi-terminal transmission line 20. Each PMU is also connected to the substation communication network and to a line 29 on opposite sides of the circuit breaker 25 and switch 26. In the example shown in FIG. 1, substation 1 comprises PMUs 30-1 and 30-2 (PMUs 1 and 2, respectively) connected to substation communication network 28-1. Substation 1 is connected to an associated load 32-1, denoted Load 1. Substation 2 comprises PMUs 30-3 and 30-4 (PMUs 3 and 4, respectively) connected to substation communication network 28-2 and is connected to a generator 34-1, denoted G1. Substation 3 comprises PMUs 30-5 and 30-6 (PMUs 5 and 6, respectively) connected to substation communication network 28-3 and is connected to a generator 34-2, denoted G2.

Substation 4 comprises PMUs 30-7 and 30-8 (PMUs 7 and 8, respectively) connected to substation communication network 28-4 and is connected to a generator 34-3, denoted G3. Substation 5 comprises PMUs 30-9 and 30-10 (PMUs 9 and 10, respectively) connected to substation communication network 28-5 and is connected to a load 32-2, denoted Load 2. Substation 6 comprises PMUs 30-11 and 30-12 (PMUs 11 and 12, respectively) connected to substation communication network 28-6 and is connected to a generator 34-4, denoted G4. While FIG. 1 shows multiple PMUs in each generator substation, this is not required so long as there is at least one PMU on the output side of each generator substation. Each substation also includes a global positioning system (GPS) timing receiver unit 35 that is used for network-wide timing synchronization.

Figure 2:
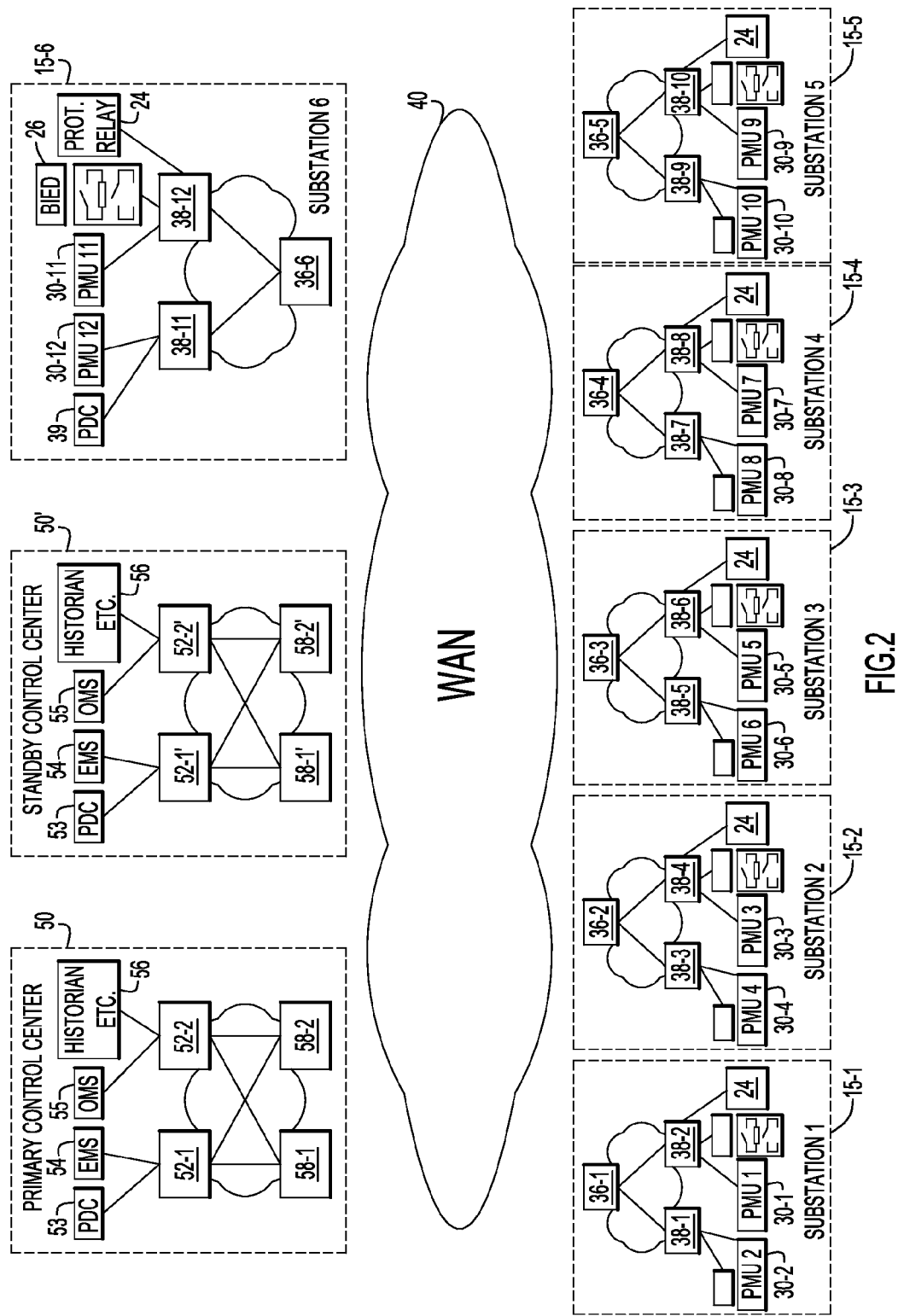
FIG. 2 is a block diagram showing the network devices used to enable communication among the plurality of substations according to the techniques described herein.

Reference is now made to FIG. 2. FIG. 2 shows the network physical view for network communication in the multi-terminal transmission system PMU network architecture 10 depicted in FIG. 1. FIG. 2 shows that each substation further includes a low latency hardware switched wide area network (WAN) network device that enables connectivity of the substation to a low latency and highly available WAN 40. Each substation further comprises a low latency hardware switched Ethernet or local area network device that connects various substation components to the substation communication network. To this end, substation 1 comprises a WAN network device 36-1 that is connected between the substation communication network 28-1 and the WAN 40, as well as local network devices 38-1 and 38-2 that interface the various components of the substation 15-1 to the substation communication network 28-1. Substation 2 comprises a WAN network device 36-2 that is connected between the substation communication network 28-2 and the WAN 40, as well as local network devices 38-3 and 38-4 that interface the various components of the substation 15-2 to the substation communication network 28-2. Each substation communication network may be employ a ring, or a redundant tree topology. Each generator substation may include a phasor data concentrator (PDC) unit 39 that collects phasor measurement data for that substation. Alternatively, the functions of the PDC may be hosted by a computing apparatus in the network, e.g., at another substation or at a control center as described hereinafter. In this way, one or more (or all) of the generator substations may direct their phasor measurement data to a computing apparatus configured to host the PDC functions for the phasor measurement data from the plurality of generator substations. The WAN 40 can be built on any of a variety of low latency network technologies, such as Synchronous Optical Networking (SONET), Microwave, Metro Ethernet, Dense Wavelength Division Multiplexed (DWDM), etc. The data link layer of the network 40 is packet-based and uses source specific multicasting techniques as described herein. The network devices 36 and 38 are low latency switches that are useful for protection functions to support approximately ¼ cycle of end-to-end information exchange between the PMUs and the protection relays.

Also shown in FIG. 2 are a primary control center 50 and a standby control center 50', each of which is connected to the WAN 40. The primary control center 50 comprises redundant low latency local area network devices 52-1 and 52-2 that connect a PDC 53, Energy Management System (EMS) 54, Outage Management System (OMS) 55, and Historian 56 to a communication network 57. The Historian 56 is a special purpose database that is useful for telemetry data. Redundant WAN devices 58-1 and 58-2 at the primary control center 50 provide WAN connectivity to WAN 40. The standby control center 50' comprises components redundant to that of the primary control center, e.g., redundant low latency local area network devices 52-1' and 52-2' that connect a PDC 53', EMS 54', OMS 55', and Historian 56' to a communication network 57'. Redundant WAN devices 58-1' and 58-2' at the primary control center 50 provide WAN connectivity to WAN 40.

The WAN 40 is a private or service-provider hosted low latency (fiber-based) communication network that links all of the endpoints (substations) with each other in a high-redundancy configuration. As explained further hereinafter, the WAN 40 may use technologies such as multicast, multiple protocol label switching (MPLS), Metro Ethernet, etc., to efficiently and robustly deliver traffic between the PMUs, protection relays and observation stations (control centers).

Figure 3:
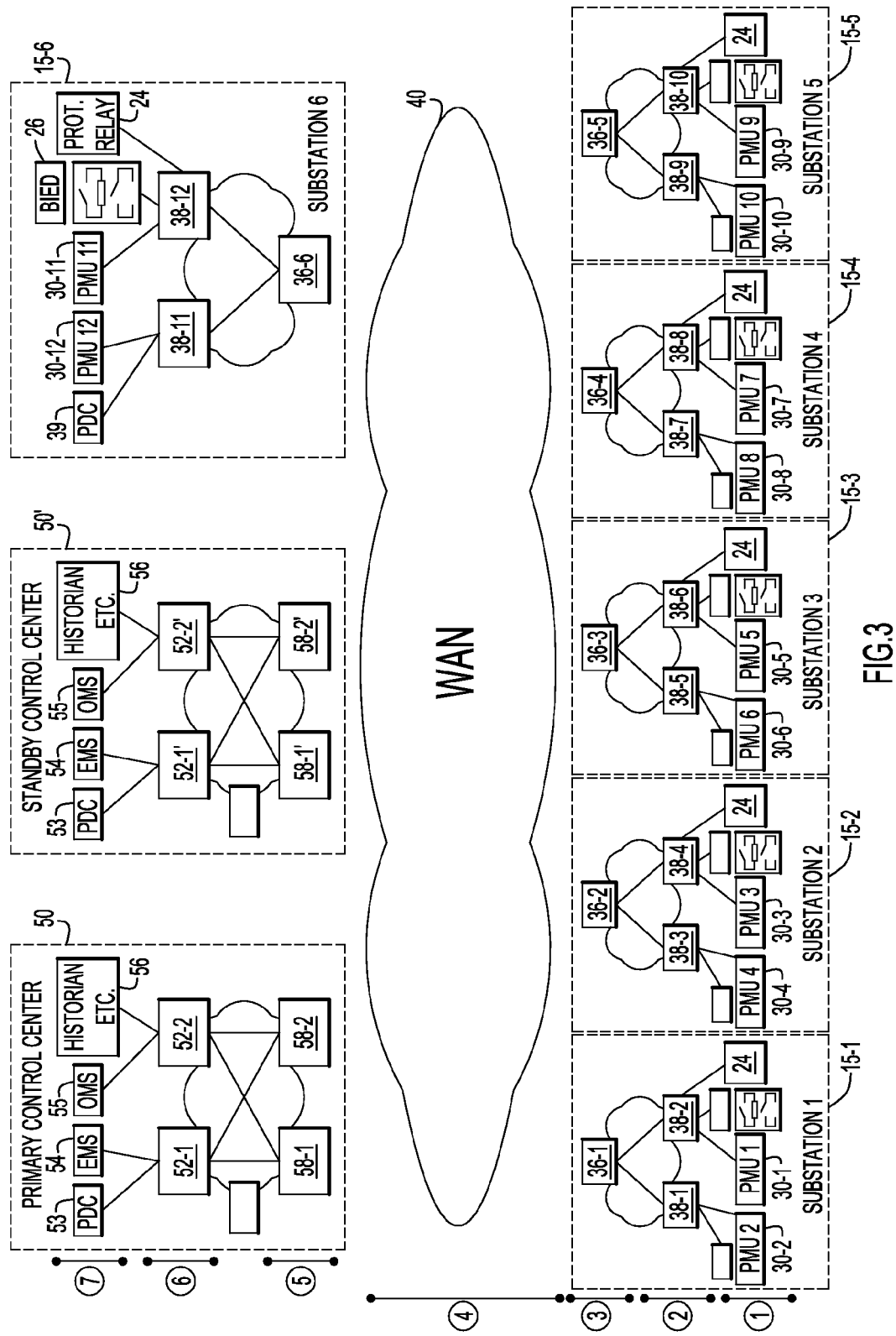
FIG. 3 is a block diagram similar to FIG. 2 and illustrating the different levels of communication used according to the techniques described herein.

Turning to FIG. 3, a diagram is shown that is similar to FIG. 2 but further illustrates the different network protocols that may be used at the various levels of the network architecture 10. FIG. 3 also shows that the primary control center 50 and the standby control center 50' also include a firewall device 59 and 59', respectively. The various levels are enumerated 1-7 in FIG. 3. Level 1 concerns the mechanism/protocol to carry/transport PMU data, protection relay data, and circuit breaker/BIED controls. Examples of suitable protocols for this level include IEEE 37.118, IEC 61850-Generic Object Oriented Substation Events (GOOSE)/Sampled Values, IEC 61850-90-5 PMUs, Distributed Network Protocol 3.0 (DNP3) or other Supervisory Control and Data Acquisition (SCADA) protocols, Mirrored Bits™, and IEC 61850-Manufacturing Message Specification (MMS).

Level 2 concerns the mechanism/protocol for sending communications from the PDC, PMUs, protection relay and circuit breaker/BIED to the lower level network devices 38 and from the network devices 38 to the PDC, PMUs, protection relay and circuit breaker/BIED. Examples of suitable protocols include Ethernet/IEEE 802.1d/802.1q, Serial C37.94, Circuit Emulation, Flexlink/REP, IEC 62439 (PRP), VLAN Segmentation, Internet Group Management Protocol (IGMP) version 3-sn, Multicast Listener Discovery (MLD) version 2-sn, and IEEE 802.1x.

Level 3 is the mechanism/protocol for communications in the substation communication network to the WAN network device of a substation. Examples of protocols that may be used include Ethernet, Internet Protocol (IP) version 4 or version 6, IGMPv3, MLDv2, Protocol Independent Multicast (PIM)-Source Specific Multicast (SSM), PIMv6-SSM, Virtual Routing and Forwarding (VRF)-Lite.

Level 4 pertains to the communications across WAN from a WAN network device of a substation to a WAN network device of another substation or to a control center. Examples of protocols suitable for this level of communications include MPLS (MPLS pt2 mPt, MPLS Fast ReRoute (FRR), MPLS Traffic Engineering (TE) (RSVP)/Transport Profile (TP), Virtual Private LAN Service (VPLS), Metro Ethernet, IPv4/IPv6 Unicast Routing (ISIS/OSPF/BGP), GETVPNs-crypto.

Level 5 refers to the communication from the WAN network devices 58-1 and 58-2 of the control centers to the firewall unit 59. Examples of suitable protocols are Ethernet, IPv4/IPv6, IGMPv3, MLDv2, PIM-SIM, PIMv6-SIM, VRF-Lite, Security Industry Association (SIA) Digital Communication Standard Internet Protocol Event Reporting.

Level 6 refers to the communication within a control center between a firewall unit and the network devices 52-1 and 52-2. Examples of protocols suitable for this communication are Ethernet/IEEE 802.1d/802.1q, Fiber Channel, Fiber Channel over Ethernet, Flexlink/REP, VDCs, VLAN Segmentation, IGMPv3-sn, MLDv2-sn, 802.1x.

Finally, Level 7 refers to the communication between the network devices and the PDC, EMS, OMS, and Historian servers in the control center. Examples of protocols suitable for this level of communication include IEEE C37.118, IEC 61850-GOOSE/Sampled Values, IEC 61850-90-5 PMUs, DNP3 or other SCADA protocols, IEC 61850-MMS, Inter-Control Center Communications Protocol (ICCP).

The protocol configurations depicted in FIG. 3 make use of SSM, line speed and group cryptography to provide low latency, secure PMU messaging.

Figure 4:
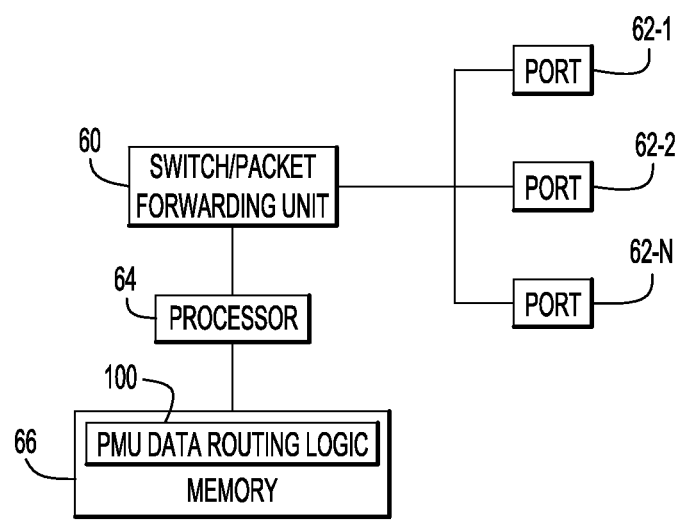
FIG. 4 is a block diagram of an example network device in a substation and configured to route measurement data according to the techniques described herein.

Reference is now made to FIG. 4 that illustrates an example block diagram of one of the network devices 38-1 to 38-12 at a substation. This network device is a switch, router or similar device that performs packet forwarding in a network. The network device comprises, among other components, a switch/packet forwarding unit 60, a plurality of network ports 62-1 to 62-N, a processor 64 and a memory 66. The switch/packet forwarding unit 60 may be implemented by one or more application specification integrated circuits (ASICs) that perform various processing of packets to determine which of the plurality of ports 62-1 to 62-N to direct a packet (based on header information, etc.) The switch/packet forwarding unit 60 includes a queue for incoming packets, as well as various other digital logic to perform the packet forwarding operations. The ports 62-1 to 62-N are network ports, e.g., Ethernet ports. The processor 64 is a microprocessor or microcontroller, for example, that executes instructions stored in memory 66. To this end, the memory 66 stores instructions for PMU data routing logic 100. When the processor 64 executes the PMU data routing logic 100, it uses routing tables to perform certain operations described further hereinafter in connection with FIG. 5.

The memory 66 may comprise read only memory (ROM), random access memory (RAM), magnetic disk storage media devices, optical storage media devices, flash memory devices, electrical, optical, or other physical/tangible memory storage devices. Thus, in general, the memory 66 may comprise one or more computer readable storage media (e.g., a memory device) encoded with software comprising computer executable instructions and when the software is executed (by the processor 64) it is operable to perform the operations described herein in connection with logic 100.

A primary purpose of the network architecture described herein is to exchange PMU information among generator substations (endpoints) in a distributed manner, without requiring all information to go through a central control center. PMU data from each PMU at a generator substation is networked to all or select ones of the other generator substations. PMUs receive configuration commands and settings from a management system, e.g, a control center. In particular, PMU data messages from each generator substation are sent to all of the generator substations at very low latency with zero packet loss. In general, the number of endpoints (substations) can be two or more. Optionally, PMU data may also be sent to the control center at the same time it is being sent to the substations. At the receiving or destination ends, the PMU data passes through PDC function for time alignment. As explained above, this could be a performed by a PDC application server at that destination, or by a PDC service hosted at some place in the network and virtualized on behalf of the various generator substations.

SSM techniques are used to set up a multiple data publish and subscribe solution in the network without placing any burden on the PMUs which do not have the capability to support such functions. Since the network handles the data flows, a PMU gateway is not required. The network devices 38-1 to 38-12 at the substations route PMU data and automatically duplicate data at the most efficient locations in the network. The source device of the data to be sent is not aware of the intended recipients because that is handled by the appropriate one or more of the network devices 38-1 to 38-12. A recipient device, e.g., protection relay, PDC, etc., that is to receive PMU data joins a multicast stream, with the appropriate one or more network devices, to receive PMU messages from the desired sources of PMU data. SSM is an extension of IP multicast where datagram traffic is forwarded to receivers from only those multicast sources to which the receivers have explicitly joined. For multicast groups configured for SSM, only source-specific multicast distribution trees (no shared trees) are created. SSM automatically determines the best locations in the network to duplicate packets when multiple destinations are involved, thus avoiding excess network traffic.

The PMUs are sensors in an electrical network. The protection relays can examine PMU data in real-time and decide on what protective action to take, if any. Again, each generator substation receives the PMU data from every other generator substation on the line being protected. The network device in each substation replicates and filters the PMU data traffic stream in hardware at various points. The protection relay also controls the BIED if and when it should trip. IEC 61850 GOOSE or other protocols such as Mirrored bit can be used to for this function.

Figure 5:
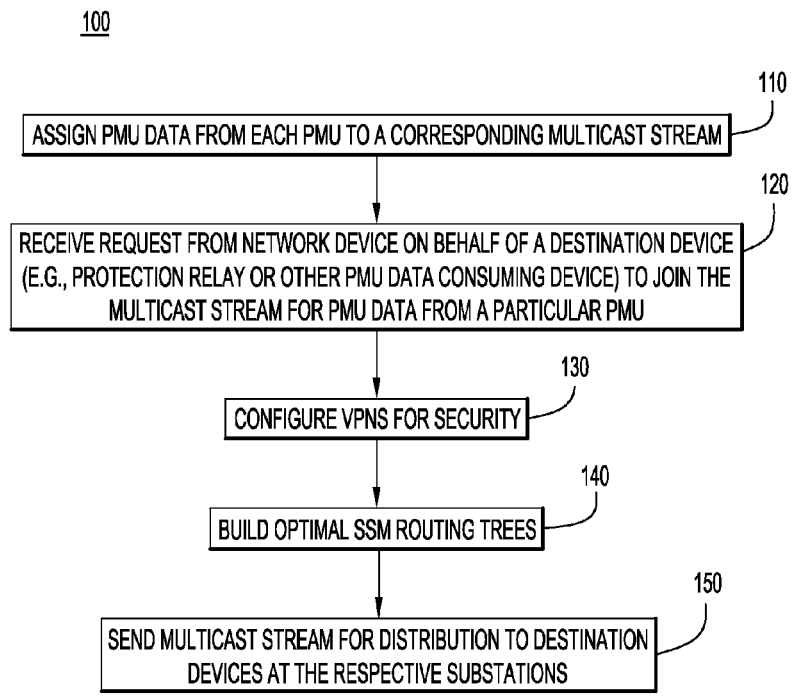
FIG. 5 is a flow chart that depicts operations of the network device shown in FIG. 4.

Turning now to FIG. 5, a flow chart is show that depicts the operations of the PMU data routing logic 100. Each network device in a substation performs these operations with respect to PMU data generated by a PMU at that substation. At 110, PMU data from each PMU is assigned to a corresponding multicast stream to which any device can subscriber using SSM techniques. At 120, a request is received from a network device (at one of the other substations) on behalf of a destination device (e.g., protection relay or other PMU data consuming device) to join the multicast stream for PMU data for a particular PMU. For example, one or more local area network devices and one or more WAN network devices at a first substation receive from one or more local area network devices and one or more WAN network devices at a second substation a request to join a multicast stream of phasor measurement data from a particular PMU at the first substation so that a protection relay or other destination device at the second substation receives the PMU data from the particular PMU at the first substation.

At 130, the virtual private networks (VPNs) are configured for security to support the distribution of the PMU data stream. At 140, the optimal SSM routing trees are built for distribution for the PMU data stream among the plurality of generator substations.

At 150, the network device sends the multicast PMU data stream for distribution to destination devices at the respective generator substations according to the SSM routing trees built at 140. As explained above in connection with FIGS. 2 and 3, the multicast stream is sent across a WAN (e.g., a fiber-based WAN) to one or more other substations.

Referring now to FIG. 6, a diagram is shown that depicts the multicast information flow for PMUs. The lines/arrows labeled 200 are PMU data streams from "odd" numbered PMUs. The odd PMUs happen to sit closer to the transmission line junction points between the substation and the multi-terminal transmission line. In this example, the odd PMUs are therefore possibly a useful set of PMUs to monitor in order to determine fault location between substations. The lines/arrows labeled 210 are PMU data streams from "even" numbered PMUs. The even PMUs in this example are located on the "inside", that is closer to the generator on the opposite side of the circuit breaker from the odd PMUs. In the case of generator substations, the "inside" PMUs are useful in synchronization when bringing a generator back online. The arrangement of the PMU's in the manner shown in FIG. 4 is only an example and not intended to be limiting. Other arrangements are possible without departing from the scope and intent of the techniques described herein. The lines/arrows labeled 220 represent the multicast stream from the local odd PMU. The multicast stream uses an optimal path so that traffic from a PMU is only received once by the protection relay. An advantage of the scheme depicted in FIG. 4 is that traffic from any of the PMUs can be on-demand replicated (in hardware, for example) and directed to the protection relay to build the appropriate protection logic. Protection logic no longer has to be build base on constrained information or "guesswork" (state estimation).

In summary, the techniques disclosed herein involve a fiber-based low latency communication network employing multi-protocol label switching (MPLS) and multicast techniques to transport synchrophasor data messages from each endpoint of a multi-terminal transmission line to all of the other endpoints with zero packet loss. The network architecture and phasor measurement data routing techniques described herein are useful to enable faster integration of new power sources, e.g., wind farms, into a transmission system.

Thus, in one form, a system is provided comprising a plurality of generator substations each of which has an associated power generator, and comprises a transformer unit, a circuit breaker configured to connect between a multi-terminal transmission line and the transformer unit, a protection relay, at least one phasor measurement units configured to make measurements on an output side of a circuit breaker, one or more local area network devices configured to enable local area network communication in the substation and one or more wide area network devices configured to enable communications between substations over a wide area network. The one or more local area network devices and the one or more wide area network devices at each generator substation being configured to route a multicast stream carrying phasor measurement data from one or more of the phasor measurement units at the generator substation across the wide area network to a protection relay at one or more of the other generator substations.

In another form, a method is provided in which, at a network device of each of a plurality of generator substations that is connected to a multi-terminal transmission line, phasor measurement data produced by a phasor measurement unit at the generator substation is assigned to a multicast stream. A request is received from a network device at any of the plurality of generator substations to join the multicast stream so that a destination device at any of the plurality of generator substations receives the phasor measurement data carried by the multicast stream. The multicast stream is sent for distribution to one or more destination devices at respective ones of the plurality of generator substations.

Further still, in another form, an apparatus is provided comprising a plurality of ports configured to send packets to a network or receive packets from a network; a packet forwarding unit configured to switch/forward packets among the plurality of ports; and a processor coupled to packet forwarding unit. The processor is configured to assign phasor measurement data produced by a phasor measurement unit at a generator substation connected to a multi-terminal transmission line to a multicast stream; receive a request from a network device at any of a plurality of generator substations connected to the multi-terminal transmission line to join the multicast stream so that a destination device at any of a plurality of generator substations connected to the multi-terminal transmission line receives the phasor measurement data carried by the multicast stream; and cause the multicast stream to be sent via one or more of the plurality of ports across the network to one or more destination devices at respective ones of the plurality of generator substations.

The above description is intended by way of example only.

What is claimed is:

1. A system comprising:
a plurality of generator substations each of which has an associated power generator, and comprises a transformer unit, a circuit breaker comprising a first end and a second end, the first end configured to connect to a multi-terminal transmission line and the second end configured to connect to a transformer unit, a protection relay, at least one synchrophasor measurement unit configured to make measurements on an output side of a circuit breaker, one or more local area network devices configured to enable local area network communication in the substation and one or more wide area network devices configured to enable communications between substations over a wide area network;
the one or more local area network devices and the one or more wide area network devices at each generator substation being configured to route a multicast stream carrying synchrophasor measurement data from one or more of the synchrophasor measurement units at the generator substation across the wide area network to a protection relay at one or more of the other generator substations.

2. The system of claim 1, wherein the one or more local area network devices and one or more wide area network devices at each substation are configured to send a multicast stream carrying synchrophasor measurement data from each synchrophasor measurement unit at that generator substation across the wide area network to the protection relay at each of the other generator substations.

3. The system of claim 1, wherein the one or more local area network devices and one or more wide area network devices at a first generator substation are configured to receive from one or more local area network devices and one or more wide area network devices at a second generator substation a request to join a multicast stream of synchrophasor measurement data from a particular synchrophasor measurement unit at the first generator substation so that a protection relay at the second generator substation receives the synchrophasor measurement data from the particular synchrophasor measurement unit at the first generator substation.

4. The system of claim 1, wherein the one or more local area network devices and one or more wide area network devices at each generator substation are configured to send a multicast stream carrying synchrophasor measurement data from each synchrophasor measurement unit at that generator substation across the wide area network to a control center that is connected to the wide area network.

5. The system of claim 1, wherein the wide area network is a fiber-based network that uses multiple protocol label switching techniques.

6. The system of claim 1, wherein the one or more local area network devices and one or more wide area network devices at each substation are configured to send a multicast stream carrying synchrophasor measurement data to protection relays at the plurality of generator substations from a synchrophasor measurement unit configured to make measurements proximate a junction point between the generator substation and the multi-terminal transmission line to facilitate determination of a fault location between generator substations.

7. The system of claim 1, and further comprising a computing apparatus configured to host synchrophasor data concentrator functions for the synchrophasor measurement data from the plurality of generator substations.

8. The system of claim 1, wherein the system further comprises at least a first synchrophasor measurement unit and a second synchrophasor measurement unit, with the first synchrophasor measurement unit located in proximity to a transmission line junction point between the substation and the multi-terminal transmission line, and the second synchrophasor measurement unit located on the second side of the circuit breaker in proximity to the power generator.

9. The system of claim 8, wherein the first phase measurement unit is used to determine fault locations between substations and the second phase measurement unit synchronizes bringing a generator online.

10. A method comprising:
at a network device of each of a plurality of generator substations that is connected to a multi-terminal transmission line, assigning synchrophasor measurement data produced by a synchrophasor measurement unit at the generator substation to a multicast stream;
receiving a request from a network device at any of the plurality of generator substations connected to the multi-terminal transmission line to join the multicast stream so that a destination device at any of the plurality of generator substations receives the synchrophasor measurement data carried by the multicast stream; and
sending the multicast stream for distribution to one or more destination devices at respective ones of the plurality of generator substations.

11. The method of claim 10, and further comprising replicating the synchrophasor measurement data for local distribution to one or more destination devices within the substation where the synchrophasor measurement data is produced.

12. The method of claim 10, wherein sending comprises sending the multicast stream across a wide area network to one or more other generator substations.

13. The method of claim 12, wherein sending comprises sending the multicast stream across a fiber-based wide area network.

14. The method of claim 10, wherein assigning comprises assigning synchrophasor measurement data from each of a plurality of synchrophasor measurement units at a substation to a corresponding multicast stream.

15. The method of claim 10, wherein sending comprises sending each multicast stream for reception by one or more destination devices at each of the other generator substations.

16. The method of claim 15, wherein sending comprises sending from each generator substation destined for each of the other generator substations, a multicast stream carrying synchrophasor measurement data from a synchrophasor measurement unit that is configured to make measurements proximate a junction between the generator substation and the multi-terminal transmission line.

17. The method of claim 10, and further comprising sending the multicast stream across a wide area network to a control center.

18. The method of claim 10, and further comprising directing synchrophasor measurement data from the plurality of generator substations to a computing apparatus configured to host synchrophasor data concentrator functions for the synchrophasor measurement data from the plurality of generator substations.

19. An apparatus comprising:
a plurality of ports configured to send packets to a network or receive packets from a network;
a packet forwarding unit configured to switch/forward packets among the plurality of ports;
a processor coupled to packet forwarding unit and configured to:
assign synchrophasor measurement data produced by a synchrophasor measurement unit at a generator substation connected to a multi-terminal transmission line to a multicast stream;
receive a request from a network device at any of a plurality of generator substations connected to the multi-terminal transmission line to join the multicast stream so that a destination device at any of a plurality of generator substations connected to the multi-terminal transmission line receives the synchrophasor measurement data carried by the multicast stream; and
cause the multicast stream to be sent via one or more of the plurality of ports across the network to one or more destination devices at respective ones of the plurality of generator substations.

20. The apparatus of claim 19, wherein the processor is configured to cause the multicast stream to be sent across a wide area network to one or more other generator substations.

21. The apparatus of claim 19, wherein the processor is configured to assign synchrophasor measurement data for each of a plurality of synchrophasor measurement units at a generator substation to a corresponding multicast stream.

22. The apparatus of claim 21, wherein the processor is configured to cause each multicast stream to be sent for reception by one or more destination devices at each of the other generator substations.

23. The apparatus of claim 20, wherein the processor is further configured to cause each multicast stream to be sent across the network to a control center.

* * * * *